(12) United States Patent
Oechsner

(10) Patent No.: US 6,939,603 B2
(45) Date of Patent: Sep. 6, 2005

(54) THERMAL BARRIER COATING HAVING SUBSURFACE INCLUSIONS FOR IMPROVED THERMAL SHOCK RESISTANCE

(75) Inventor: Matthias Oechsner, Muelheim a.d.Ruhr (DE)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/087,716

(22) Filed: Mar. 1, 2002

(65) Prior Publication Data

US 2002/0136884 A1 Sep. 26, 2002

Related U.S. Application Data

(60) Provisional application No. 60/277,807, filed on Mar. 22, 2001.

(51) Int. Cl.[7] .............................. B32B 15/04; F03B 3/12
(52) U.S. Cl. ................. 428/304.4; 428/136; 428/315.5; 428/323; 428/632; 428/633; 428/701; 428/702; 416/241 B
(58) Field of Search ................................ 428/632, 633, 428/131, 136, 304.4, 315.5, 469, 701, 702, 697, 699, 323; 416/241 B, 241 R, 235, 236 R

(56) References Cited

U.S. PATENT DOCUMENTS

| | | |
|---|---|---|
| 2,045,099 A | 7/1936 | Pond |
| 3,825,364 A | 7/1974 | Halila et al. |
| 4,245,954 A | 1/1981 | Glenn |
| 4,289,447 A | 9/1981 | Sterman et al. |
| 4,376,004 A | 3/1983 | Bratton et al. |
| 4,414,249 A | 11/1983 | Ulion et al. |
| 4,642,086 A | 2/1987 | Howarth, Jr. |
| 4,846,906 A | 7/1989 | Helferich et al. |
| 4,892,786 A | 1/1990 | Newkirk |
| 5,281,487 A | 1/1994 | Rumaner et al. |
| 5,305,726 A | 4/1994 | Scharman |
| 5,320,909 A | 6/1994 | Scharman et al. |
| 5,534,308 A | 7/1996 | Bamberg |
| 5,562,998 A | 10/1996 | Strangman |
| 5,683,825 A | 11/1997 | Bruce et al. |
| 5,786,988 A | 7/1998 | Harari |
| 5,854,154 A | 12/1998 | Radford et al. |
| 5,942,337 A | 8/1999 | Rickerby et al. |
| 5,975,852 A | 11/1999 | Nagaraj et al. |
| 5,993,976 A | 11/1999 | Sahoo |
| 6,013,592 A | 1/2000 | Merrill et al. |
| 6,042,951 A | 3/2000 | Kojima et al. |
| 6,057,047 A | 5/2000 | Maloney |
| 6,060,174 A | 5/2000 | Sabol et al. |
| 6,071,628 A * | 6/2000 | Seals et al. |
| 6,102,656 A | 8/2000 | Nissley et al. |

(Continued)

Primary Examiner—Jennifer McNeil

(57) ABSTRACT

A component (10) having a thermal barrier coating (14) exhibiting an improved resistance to thermal shock. A plurality of stress relieving cracks (22) are formed at the free surface (24) of the thermal barrier coating as a result of the expansion of an inclusion (20) having a higher coefficient of thermal expansion than that of the surrounding matrix material (16). The inclusions function as crack initiators during the fabrication process as well as crack arrestors preventing the propagation of the cracks farther into the matrix material. The inclusion material may be selected to have an evaporation temperature that is less than the peak matrix material processing temperature, wherein the inclusion material will evaporate to leave a plurality of voids (30). In one embodiment, a superalloy substrate (12) is coated with a ceramic thermal barrier coating material having a plurality of spherical polymer inclusions disposed below its free surface. When the ceramic material is heated to its sintering temperature, the polymer inclusions induce cracks in the ceramic material through which the polymer then diffuses upon its subsequent evaporation.

23 Claims, 1 Drawing Sheet

U.S. PATENT DOCUMENTS

| | | |
|---|---|---|
| 6,103,386 A | 8/2000 | Raybould et al. |
| 6,106,959 A | 8/2000 | Vance et al. |
| 6,129,988 A | 10/2000 | Vance et al. |
| 6,129,991 A | 10/2000 | Warnes et al. |
| 6,190,124 B1 * | 2/2001 | Freling et al. |
| 6,203,927 B1 | 3/2001 | Subramanian |

* cited by examiner

THERMAL BARRIER COATING HAVING SUBSURFACE INCLUSIONS FOR IMPROVED THERMAL SHOCK RESISTANCE

This application claims benefit of the Mar. 22, 2001, filing date of U.S. Provisional Patent Application Ser. No. 60/277,807.

FIELD OF THE INVENTION

This invention related generally to the field of materials, and more particularly to materials insulated with a ceramic thermal barrier coating, and specifically to a ceramic material having inclusions deposited a predetermined depth below a top surface for forming a plurality of stress relieving cracks at the top surface.

BACKGROUND OF THE INVENTION

It is well known to provide a ceramic thermal barrier coating on a surface of a component that will be exposed to very high operating temperatures. One such component that has received much public notoriety is the United States space shuttle vehicle. More commonplace applications for such technology include the hot combustion gas portions of a gas turbine engine, as may be used for aircraft propulsion or electrical power generation.

Ceramic materials generally have excellent hardness, heat resistance, abrasion resistance and corrosion resistance, and they are therefore very desirable for high temperature machine applications such as gas turbines and the like. However, ceramic materials are easily fractured by tensile stresses and exhibit a high degree of brittleness. To improve upon the fracture toughness of a ceramic thermal barrier coating material, it is known to utilize a columnar grained microstructure. Microstructure gaps between the individual columns allow the columnar grains to expand and to contract with changes in temperature without developing stresses that could cause spalling. Unfortunately, such gaps may close once the component is placed into operation due to the sintering of the sides of adjacent columns.

A crack at the surface of a ceramic material may function to relieve thermally induced stresses in a manner similar to the microstructure gaps of a columnar material. Vertical surface segmentation (i.e. normal to the component surface) will be observed if a material is exposed to thermal cycling or thermal shock resulting in thermal stresses that exceed the strength of the material. The material releases its strain energy by creating the crack surfaces, thereby improving its overall strain tolerance. Such cracks propagate from the free surface into the material and may stop after they reach a certain distance into the material. However, such surface cracks often continue to propagate into the material due to the concentration of stresses at the crack tip, and they may result in catastrophic failure of the ceramic coating and/or underlying component.

SUMMARY OF THE INVENTION

Accordingly, it would be desirable to have a ceramic thermal barrier coating material that exhibits an improved resistance to thermal shock and improved fracture toughness. It is also desirable to form a component utilizing such a coating to protect a substrate material during high temperature operation.

A thermal barrier coating is disclosed herein as including a layer of a ceramic material having a free surface; a plurality of inclusions disposed below the free surface of the layer of ceramic material; and a plurality of cracks extending from respective ones of the plurality of inclusions to the free surface.

A method of fabricating such a thermal barrier coating is described herein as including the steps of: selecting a thermal barrier coating matrix material; forming inclusion particles of a material having a coefficient of thermal expansion greater than that of the thermal barrier coating matrix material; forming a layer of the thermal barrier coating material having a plurality of the inclusion particles disposed below a free surface of the layer; and, heating the layer of thermal barrier coating material and inclusion particles to cause a plurality of cracks to form between the respective inclusion particles and the free surface.

The method may further include heating the layer of the thermal barrier coating material and inclusion particles to a temperature sufficiently high to cause the material of the inclusion particles to evaporate and to diffuse through the respective cracks. Such a method will produce a thermal barrier coating wherein the inclusions comprise voids.

In one embodiment, the method may include forming the layer of ceramic material from one of the group of alumina, zirconia, yttria-stabilized zirconia, and magnesia-stabilized zirconia; and forming the inclusions from a material having a coefficient of thermal expansion greater than that of the ceramic material and comprising one of the group of a polymer, ceramic, glass and metal material.

A component adapted for operation at an elevated temperature is described herein as including: a substrate material; a thermal barrier coating disposed on the substrate material, the thermal barrier coating further comprising: a layer of ceramic material; a plurality of inclusions disposed below a free surface of the ceramic material; and a crack extending from respective ones of the plurality of the inclusions to the free surface of the ceramic material. The inclusions have a coefficient of thermal expansion greater than that of the ceramic material. The inclusions may be formed to be a hollow shape such as a hollow sphere.

DETAILED DESCRIPTION OF THE INVENTION

Figure 1A:
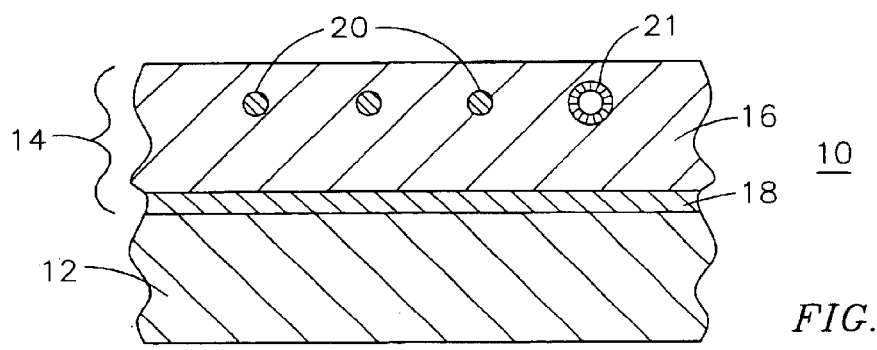
FIG. 1A-1C are partial cross-sectional views at various stages of fabrication of a component having a substrate material insulated by a thermal barrier coating having subsurface inclusions that generate stress-relieving cracks at the surface of the coating.
Figure 1B:
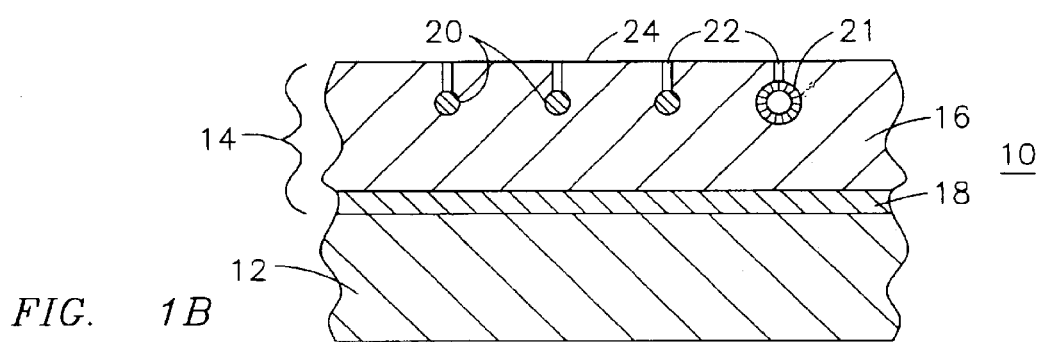
Figure 1C:
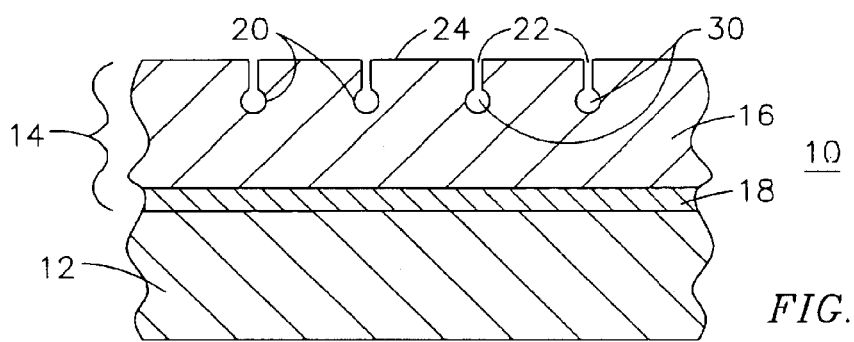

FIGS. 1A–1C illustrate a portion of a component 10 adapted for operation at an elevated temperature as it would appear at various stages of fabrication. As will be described more fully below, component 10 contains a plurality of stress-relieving surface cracks created by the thermal expansion of respective subsurface inclusions.

Component 10 includes a substrate material 12, for example a superalloy material forming a part of a combustion turbine. A thermal barrier coating 14 is disposed on the substrate material 12. The thermal barrier coating 14 may include a ceramic oxide material 16 as is known in the art, such as for example yttria stabilized zirconia (YSZ). The thermal barrier coating 14 may also include a bond coat 18 applied between the substrate material 12 and the ceramic oxide material 16. The bond coat 18 may be, for example, an MCrAlY type coating as is known in the art. Bond coat 18 and ceramic material 16 may be applied by any known process.

Component 10 is fabricated to include a plurality of inclusions 20 disposed within the layer of insulating ceramic material 16. Inclusions 20 are selected to be particles of a material having a coefficient of thermal expansion that is greater than that of the ceramic material 16. Polymers including polyester, ceramics and metals are non-limiting examples of materials that may be used as inclusions 20. FIG. 1A illustrates component 10 as it would appear immediately following the deposition of thermal barrier coating layer 14 including the subsurface inclusions 20.

FIG. 1B illustrates the component 10 of FIG. 1A following a high temperature thermal processing step, such as a sintering step used to cure and to densify the ceramic matrix material 16. Because the material of inclusions 20 is selected to have a coefficient of thermal expansion that is higher than that of the surrounding ceramic matrix material 16, significant stresses will be developed within the matrix material 16 during this process. These stresses may exceed the tensile strength of the material 16, thereby causing the material to fail and to form cracks 22.

Figure 2:
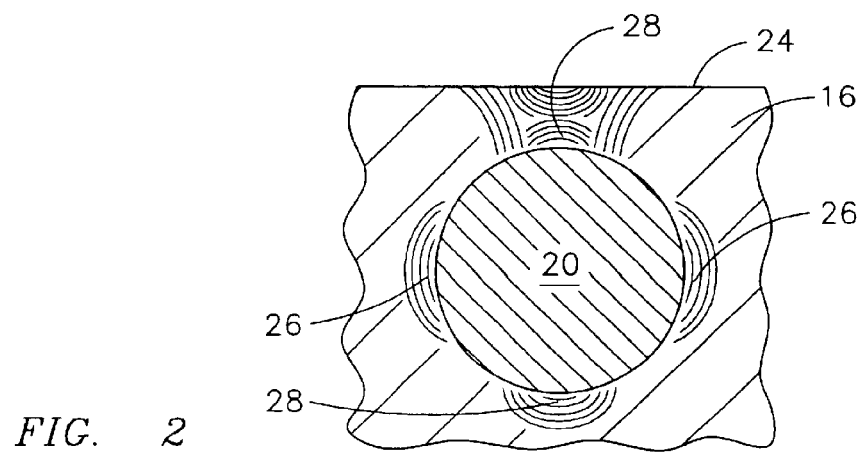
FIG. 2 illustrates the stress distribution in the matrix material surrounding a subsurface inclusion in the component of FIG. 1A-1C.

A finite element analysis was used to estimate the lateral stresses developed in the matrix material 16 during such a process. FIG. 2 depicts the lateral stress distribution around a subsurface inclusion 20 due to a temperature increase over the stress free temperature. The matrix material 16 is placed in compression on opposed sides 26 of the inclusion 20, and in tension in the areas 28 above and below the inclusion 20 as a result of the presence of the free surface 24 above the inclusion 20. The thermal growth of inclusion 20 may generate tensile stresses in the matrix material 16 that exceed the tensile strength of the material. As a result, cracks 22 as illustrated in FIG. 1B may form between the inclusion 20 and the top free surface 24 of the thermal barrier coating 14. In one model where the coefficient of thermal expansion of the matrix material 16 is $10e^{-6}K^{-1}$ and where the coefficient of thermal expansion of the inclusion 20 is twice that value, a 1,000° C. temperature rise above the stress free temperature resulted in a peak tensile stress in the matrix material 16 in the area 28 above the inclusion 20 of about 30 GPa. This value is well above the tensile strength limit of many ceramic materials and would result in the propagation of a crack 22 between the inclusion 20 and the free surface 24. The level of tensile stress generated above the inclusion 20 is greater than that below the inclusion 20 due to the presence of the free surface 24. Therefore, it is possible for a predetermined application to select material properties, dimensions and process conditions that will create a crack 22 between the inclusion 20 and the free surface 24 without creating any crack below the inclusion 16. This is the condition illustrated in FIG. 1B. Note that in this condition, there exists a stress relieving crack 22 at the free surface 24, but there exists no crack tip in the matrix material 16. Without a stress concentrating tip, crack 22 will not propagate farther through the matrix material 16, but rather will be arrested by the presence of the inclusion. Accordingly, the inclusion 20 acts both as a crack initiator and as a crack arrestor.

For any particular application, a predetermined pattern of cracks 22 may be developed in this manner in the surface 24 of a brittle material, thereby improving the thermal shock resistance of the material. The size, shape, depth, spacing, temperature rise and material of the inclusions 20 may be varied to achieve a desired crack pattern. When this material is heated, cracks will develop between the inclusion and the free surface, and importantly, none will develop in other directions around the inclusion.

FIG. 1C illustrates the component 10 of FIG. 1B after further processing wherein the material of inclusion 20 has been evaporated and has diffused through the respective cracks into the surrounding environment leaving voids 30. This embodiment will occur when the processing temperature exceeds that of the evaporation temperature of the inclusion material. A similar result may be obtained by exceeding the melting temperature of the inclusion material or otherwise causing the inclusion material to break down. Once the inclusion material has evaporated, melted or otherwise reformed, it may flow away from the matrix material 16 through cracks 22 thereby creating the voids 30. Voids 30 represent another form of subsurface inclusion. Voids may offer the advantage of reducing the rate of heat transfer through thermal barrier coating 14. In one embodiment, inclusion 16 is formed of a polymer having a relatively low evaporation temperature relative to the densification/sintering temperature of ceramics. As the thermal barrier coating 14 is heated the polymer inclusion 16 will expand relative to the matrix ceramic 16 due to the mismatch of the Young's modulus in the two materials, and cracks 22 will form. As the temperature is further increased to densify the ceramic 16, the polymer will evaporate and be driven through the cracks 22, leaving voids 30.

The inclusions 20 do not have to be solid bodies, but may be hollow objects such as hollow sphere 21 illustrated in FIGS. 1A and 1B. The inclusions may be limited to a particular size range in order to ensure more accurate control of the stresses generated in the matrix material during the high temperature process. In general, the material selected to form the inclusions 20 of FIG. 1A may be selected to have a coefficient of thermal expansion greater than that of the matrix material, and thermal stability and sufficient stiffness up to a temperature range where the matrix material sinters and/or densifies. The inclusion material may also be selected to have decomposition, melting, or evaporation temperature at or below the maximum matrix processing temperature is it is desired to obtain voids as the inclusions.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A component adapted for operation at an elevated temperature, the component comprising:

a substrate material;

a thermal barrier coating disposed on the substrate material, the thermal barrier coating further comprising:

a layer of ceramic material;

a plurality of inclusions having a coefficient of thermal expansion greater than that of the ceramic material disposed below a free surface of the ceramic material; and a crack extending from respective ones of the plurality of the inclusions to the free surface of the ceramic material.

2. The component of claim 1, further comprising:

the substrate material comprises a superalloy material;

the ceramic material comprises one of the group of alumina, zirconia, yttria-stabilized zirconia, and magnesia-stabilized zirconia; and wherein the inclusions comprise a material having a coefficient of thermal expansion greater than that of the ceramic material and comprise one of the group of a polymer, ceramic, glass and metal material.

3. The component of claim 1, wherein the inclusions comprise hollow spheres of material having a coefficient of thermal expansion greater than that of the ceramic material.

4. The component of claim 1, wherein the inclusions comprise a solid material having a coefficient of thermal expansion greater than that of the ceramic material.

5. The component of claim 1, wherein the inclusions have a decomposition, melting or evaporation temperature that is at or below a maximum ceramic material processing temperature.

6. The component of claim 1, wherein the inclusions are decomposed, melted or evaporated when the ceramic material is processed to form voids in the thermal barrier coating.

7. The component of claim 1, wherein a maximum ceramic material processing temperature is equal to a sintering step temperature that cures and densities the ceramic material.

8. The component of claim 1, wherein a sintering step temperature is 1,000° C. above a stress free temperature of the ceramic material.

9. The component of claim 1, wherein the coefficient of thermal expansion of the ceramic material is $10e^{-6}K^{-1}$.

10. The component of claim 1, wherein the coefficient of thermal expansion of the inclusion is twice the coefficient of thermal expansion of the ceramic material.

11. The component of claim 1, wherein the inclusions comprise a polymer, ceramic or metal.

12. A thermal barrier coating comprising:

a layer of a ceramic material having a free surface;

a plurality of inclusions having a coefficient of thermal expansion greater than that of the ceramic material disposed below the free surface of the layer of ceramic material; and a plurality of cracks extending from respective ones of the plurality of inclusions to the free surface.

13. The thermal barrier coating of claim 12, further comprising:

the ceramic material comprising one of the group of alumina, zirconia, yttria-stabilized zirconia, and magnesia-stabilized zirconia; and the inclusions comprising a material having a coefficient of thermal expansion greater than that of the ceramic material.

14. The thermal barrier coating of claim 12, wherein the inclusions comprise a solid material having a coefficient of thermal expansion greater than that of the ceramic material.

15. The thermal barrier coating of claim 12, wherein the inclusions comprise a hollow material having a coefficient of thermal expansion greater than that of the ceramic material.

16. The thermal barrier coating of claim 12, wherein the inclusions have a decomposition, melting or evaporation temperature that is at or below a maximum ceramic material processing temperature.

17. The thermal barrier coating of claim 12, wherein the inclusions are decomposed, melted or evaporated when the ceramic material is processed to form voids in the thermal barrier coating.

18. The thermal barrier coating of claim 12, wherein the inclusions comprise voids.

19. A thermal barrier coating comprising:

a layer of a ceramic material having a free surface;

a plurality of stress relieving cracks extending from the free surface into the ceramic material, the cracks extending into respective voids formed from inclusions having a coefficient of thermal expansion greater than that of the ceramic material and disposed within the ceramic material below the free surface so that the cracks have no crack tip, the voids acting as respective crack arrestors within the ceramic material.

20. A thermal barrier coating comprising a top free surface divided into segments defined by a plurality of cracks extending from the top free surface into the thermal barrier coating to respective crack-arresting inclusions having a coefficient of thermal expansion greater than that of the ceramic material and disposed below the top free surface.

21. The thermal barrier coating of claim 20, wherein the inclusions comprise voids.

22. A thermal barrier coating comprising:

a layer of ceramic material having a free surface;

a plurality of inclusions disposed within the ceramic material below the free surface; and a plurality of stress relieving cracks each extending upward from a respective one of the inclusions to the free surface but not extending downward from the respective one of the inclusions into the layer of ceramic material so that the plurality of stress relieving cracks each have no crack tip within the layer ceramic material, wherein the inclusions comprise a material exhibiting a coefficient of thermal expansion that is greater than a coefficient of thermal expansion of the ceramic material.

23. The thermal barrier coating of claim 22, wherein the inclusions comprise voids.

* * * * *